United States Patent [19]
Schlüter

[11] Patent Number: 6,094,878
[45] Date of Patent: Aug. 1, 2000

[54] COMPOSITE FLOOR STRUCTURE

[75] Inventor: Werner Schlüter, Iserlohn, Germany

[73] Assignee: Schlüter-Systems GmbH, Iserlohn, Germany

[21] Appl. No.: 09/117,198

[22] PCT Filed: Jan. 15, 1997

[86] PCT No.: PCT/DE97/00102

§ 371 Date: Jul. 24, 1998

§ 102(e) Date: Jul. 24, 1998

[87] PCT Pub. No.: WO97/30247

PCT Pub. Date: Aug. 21, 1997

[30] Foreign Application Priority Data

Feb. 13, 1996 [DE] Germany .......................... 196 05 142

[51] Int. Cl.[7] .................................................. E04B 5/43
[52] U.S. Cl. .......................... 52/323; 52/220.3; 52/414; 52/480; 52/319
[58] Field of Search ................................. 52/220.3, 480, 52/319, 414, 323

[56] References Cited

U.S. PATENT DOCUMENTS

| | | |
|---|---|---|
| 560,137 | 5/1896 | Knoche . |
| 584,875 | 6/1897 | Jameton . |
| 1,921,081 | 8/1933 | Heltzel . |
| 2,695,513 | 11/1954 | Williams . |
| 3,956,864 | 5/1976 | Fung ............................... 52/414 |
| 4,588,125 | 5/1986 | Lutz . |
| 4,945,697 | 8/1990 | Ott et al. ......................... 52/396 |

FOREIGN PATENT DOCUMENTS

| | | |
|---|---|---|
| 583 101 | 1/1925 | France . |
| 1 564 439 | 4/1969 | France . |
| 855 904 | 7/1949 | Germany . |
| 10 71 112 | 12/1959 | Germany . |
| 386 069 | 1/1933 | United Kingdom . |
| 2 246 594 | 2/1992 | United Kingdom . |

Primary Examiner—Carl D. Friedman
Assistant Examiner—Patrick J. Chavez
Attorney, Agent, or Firm—Collard & Roe, P.C.

[57] ABSTRACT

A composite floor structure comprises a mortar layer set by a mineral agent and a carrier plate adjoining the lower surface of the mortar layer. The carrier plate has upwardly projecting structural members extending into the mortar. The dimensions of the mortar coating over the structural members are so low that the structures created in the mortar by the structural members represent weak areas. When stresses arise in the mortar layer, joint face assemblies connecting weak areas are formed to reduce stress in a uniform manner. By forming different joint face assemblies, a joint face structure is produced, wherein to reduce stress, the stress causing the mortar to fracture only results in a low level of longitudinal change in each individual joint face. Consequently, each individual joint face only takes the form of a microcrack.

16 Claims, 5 Drawing Sheets

COMPOSITE FLOOR STRUCTURE

BACKGROUND OF THE INVENTION

1. Field of the Invention

The invention relates to a composite floor structure comprising a mortar layer set by a mineral agent and a the carrier plate substantially consisting of a flat basic element and a great number of upwardly projecting structural elements extending into the mortar, the elements having substantially the same height.

2. The Prior Art

Composite floor structures are adequately known and are employed, for example as subfloors when floor heating systems are to be installed. Such composite floor structures representing the subfloor for the final floor covering are based on the concept of the floating composition floor; i.e., the composition floor is separated from the supporting subfloor by a soft intermediate layer and is not connected with the latter but only rests on the intermediate layer. The composition floor is provided to serve as a load-distributing layer for uniformly admitting forces of load via the intermediate layer into the supporting subfloor, for example a concrete floor.

The carrier plate, which consists of an insulating material, is placed on the supporting subfloor. The upwardly projecting elements are uniformly distributed over the rectangular or square carrier plate. The heating tubes are maintained clamped between said elements, so that they do not change their positions when the paste-like composition floor is poured on. According to the concept of the floating composition floor, the thickness of the latter has to be dimensioned in such a way that the composition floor forms an inherently load-carrying floor plate. For assuring adequate load-carrying capacity it is recommended for this reason also in German ATV-DIN 18353 that the mortar covering above the projecting elements has a thickness of at least 45 mm. However, for floors subjected to higher loads it is recommended that the minimum thickness of the composition floor be increased. If cement composition floors are to be installed, it is necessary, furthermore, to reinforced such composition floors.

Based on the covering proposed by the above standard, the composition floors installed in the sector of residential construction work have a minimum overall thickness of 45 mm plus the diameter of the heating tubes. If such diameter comes to 18 mm, the total thickness of the composition floor amounts to 63 mm.

Mortars set with mineral agents, for example the composition floors addressed above, set with a certain loss of volume. The different water release properties and temperature influences acting on the top and bottom sides of the mortar layer lead to different changes in length when the mortar layer sets, with the result that the mortar bulges.

However, bulging of the mortar layer occurs particularly also if different moisture contents are contained in the installed mortar layer, for example when a higher content of moisture is present in the lower, deeper zone of the mortar layer than in the zone on top, which is close to the floor covering. This then leads to typical concave/convex deformation. If the mortar layer is covered with a rigid floor covering material, this leads to shear-off of the covering or to cracking.

Bulging of the mortar plate is unavoidable especially when floor heating tubes are installed. In the lower zone of the mortar layer adjoining the carrier plate, the temperature amounts to, for example about 40° C. because of its direct contact with the heating tubes. However, as only a temperature of about 25° C. is dissipated into the room on top of the floor covering, a temperature gradient of 15° C. develops within the layer of mortar. When heating up, the lower regions of the mortar layer will therefore thermally expand to a distinctly higher degree than the upper zones of the mortar disposed close to the floor covering. With average room sizes of 18 to 20 square meters, bulging caused in this manner may be in the order of magnitude of up to 15 mm in height measured along the edges of the floor plate, with destruction of the marginal joint terminations in this process.

The effects bulging has on the floor are varied. For example, periodically recurring bulging, which naturally always develops in different locations in the mortar, for example in the course of the heating period in the winter and the nonheating period during the summer, may lead to growing denting of the carrier plate installed underneath the mortar layer, such plate consisting of insulating material, whereby such denting is caused by the pressure the plate applies due to the bulging of the structure of the mortar layer. Due to shifting of such pressure peaks the carrier plate disposed underneath the mortar is deformed to such an extent that the entire floor plate may sag in the course of some time.

The consequence of bulging of the layer of mortar is that certain areas of the latter lift off from the carrier plate or from its sublayers, so that even distribution of the forces in the carrier plate or in the sublayer is no longer possible. Under load, this then poses the risk that the mortar plate fractures for relieving the stress, forming a crack. Even though such fractures may go unnoticed with yielding floor coverings such as, for example, wall-to-wall carpeting, this will cause cracking also of rigid floor coverings installed on the mortar plate, for example such as tiles. Moreover, bulging leads to changes in the length of the top and bottom sides of the mortar layer. The shearing stress occurring as a result of such changes between the layer of mortar and the floor covering leads to detachment and even fracture of the rigid floor covering.

In order to counteract the phenomenon of bulging and the uncontrolled fracturing of the floor caused thereby, a change was made by reducing the degree of bulging by segmenting the floor areas, The individual mortar plates may then be separated from each other by expansion joints, trowel cuts, or so-called apparent or pseudo joints. Even though overall bulging of the individual mortar plates has been reduced in this manner, bulging still occurs to varying degrees within the individual segments, which may lead to unintended step-like bordering-up of individual floor segments against each other within the area of the joints. Furthermore, making provision for joints in the course of installation of the mortar is labor-intensive especially when larger floor areas—for example on sales premises or in larger residential rooms—have to be segmented with such expansion joints, which, moreover, need to be taken into account when the floor covering is installed later. Furthermore, mortar structures have to completely set first over at least 28 days according to acknowledged rules, so that shrinking is largely completed before a rigid floor covering can be applied. Even with composite mortar structures, whereby the mortar enters into a direct bond with the subfloor consisting of, for example concrete, the problem to be dealt with is that if the shrinking property of the subfloor is different from the one of the mortar, the layer of the latter becomes detached from the subfloor and cracking and bulging will then occur in the layer of mortar.

SUMMARY OF THE INVENTION

Based on the state of the art discussed above the invention, therefore, is based on the problem of creating a composite floor structure which, in spite of the use of a mortar set by a mineral agent, minimizes the phenomenon of bulging at least to such an extent that the risk of through-extending cracking is avoided even in connection with larger floor areas not segmented by expansion joints, so that constructions with rigid floor coverings can be produced damage-free as well.

According to the invention, the problem is solved in that the mortar covering above the projecting structural elements is dimensioned so low that the negative structures formed in the mortar by the structural elements represent predefined weak areas, so that when stresses occur in the mortar layer, the weak areas are starting points for a substantial uniform stress reduction by the system of separation areas spreading between the negative structures.

The invention makes use of the novel finding that for producing a load-bearing mortar layer it is not necessary to make provision for a covering with a thickness as found in the state of the art. The fact is rather that the load bearing capacity of the composition floor on separation layers under load is governed by adequate and uniform distribution of the load. The negative structures formed by the structural elements projecting into the bottom side of the mortar layer represent weak areas with respect to the overall thickness of the mortar layer. When stresses occur within the layer of mortar, be it in the course of setting of the mortar or on account of any temperature gradient existing when a floor heating system is used in the mortar bed, an assembly of joint faces develops in the covering mortar layer starting from the weak areas for reducing the stresses. By a predetermined arrangement of such weak areas it is possible to predetermine along which lines the assembly of joint faces will develop. Since a great number of projecting structural elements are associated with a carrier plate, uniform reduction of the stress is possible substantially across the entire mortar plate, with the consequence that due to the great number of joint faces involved, each joint face has to compensate only a fraction of the total change in length required for reducing the stress. Therefore, each individual joint face has the dimensions of a micro-hairline crack. Therefore, larger, through-extending cracks, which tear up rigid floor coverings, cannot occur. Likewise, no noticeable bulging occurs, as the triggering forces in the negative structures are compensated in the negative structures of the developing assemblies of joint faces.

Furthermore, due to the low dimensioning of the mortar covering on top of the upwardly projecting structural elements of the carrier plate, the mortar covering on top of installed floor heating tubes is distinctly reduced as well. The lower overall thickness thus conditions also a lower temperature gradient and thus superior exploitation and controllability of the heat radiated by the floor heating tubes.

The composite floor structure as defined by the invention offers considerable advantages over those of the prior art also with respect to its manufacture. The mortar bed sets at a distinctly higher rate due to its lower overall thickness. Application of the final floor covering is possible after only about 5 days depending on the thickness of the composition floor because shrinking of the mortar plates on account of the developing assemblies of joint faces is uniformly compensated across the total area.

Owing to the predetermined reduction in the stress of the composite floor structure, which can distribute itself uniformly across the entire floor area as well due to the preferably uniform distribution of the structural elements of the carrier plate, it is no longer necessary that larger floor areas have to be segmented by introducing expansion or separation joints.

With composition floor or mortar layers in a composite, a direct adhesive contact has to be produced with the subfloor. This is accomplished with the help of break-throughs suitably provided in the carrier plate. As opposed to carrier plates made from yielding insulating material, for which provision is made in connection with floating composition floors, carrier plates for composite floor structures are generally inflexible and therefore consist of, for example metal sheet or plastic material. The projecting structural elements serves for reducing the stress caused by the difference in dimensional behavior between the composition floor structure or a mortar layer and the subfloor. The layer of the composition floor or layer of mortar otherwise may be designed very thin, as occurring loads are directly introduced into the subfloor. Carrier plates without break-throughs may be joined with the subfloor by gluing, so that the load is directly introduced into the subfloor.

For the sake of better understanding, mortar is understood within the framework of the present disclosure to be any paste-like, setting mixture of water, sand and/or other aggregates produced for setting with a carbonate or sulfate vehicle such as, for example cement or plaster (such as anhydrite, magnesia, cement finish), from which composition composition floors as well as mortar or adhesive mortar layers can be produced, for example also for gluing tiles.

Provision is made in a preferred exemplified embodiment that the structural elements of the carrier plate have a circular cross section. Due to such a shape an assembly of joint faces can be formed in identical ways starting from one structural element in each direction. The direction in which the assembly of joint faces will finally develop is therefore exclusively dependent upon in which way the structural elements are arranged relative to each other.

In a particularly advantageous embodiment of the carrier plate, the individual structural elements and the mortar layer covering said elements are characterized by the following ratios:

Height of the structural elements: mortar covering beyond the top edge of the stuctural elements: smaller than 1:1, in particular less than 1:1.5, whereby the maximum mortar covering amounts to 20 mm.

Height of the structural elements: smallest spacing of the structural elements from each other: smaller than 1:5, in particular less than 1:10, whereby the spacing amounts to 200 mm maximum.

The ratios, which define the structural elements, assure that the structural elements are arranged in such a way that assemblies of joint faces reducing stress develop in the mortar bed over the shortest distance between two structural elements, and that the weak areas created by the structural elements are arranged relative to one another in such a way that in the presence of a build-up of stress exceeding a certain degree, the joint face assemblies start to reduce the stress by tearing up the mortar bed in a perforation-like manner.

Provision is made in a useful further development of the invention that the upper terminal area of the individual structural elements is arched. This measure supports the development of joint face assemblies starting from the areas of the mortar adjoining the roof the structural elements.

In a further development of the useful embodiment, the upward archings are approximately semispherically shaped, whereby the height of the arching corresponds with the intended covering of the composition floor. Such archings thus serve as an instruction for dimensioning the thickness of the composition floor. Excess flooring finish has to be removed, for example with a leveling beam resting on at least two of such archings. It seems to be adequate in this connection if provision is made for only a certain number of structural elements with the archings. The remaining structural elements may have some other configuration at their top sides.

In yet another embodiment, the carrier plate has break-throughs disposed between the structural elements. When poured, the mortar passes through the break-throughs and glues the mortar bed with the subfloor present beneath the carrier plate. Also a composite floor finish can be produced in this way with the composite floor structure as defined by the invention.

In yet another exemplified embodiment, provision is made that the structural elements are oblong elements with a long-stretched rectangular cross section. The structural elements are usefully aligned displaced against each other by 90 degrees in pairs, so that the imagined extension of each structural element is aligned in its longitudinal expanse with the center of the adjacent structural element, the latter being arranged crosswise relative to the former. With such an arrangement of the structural elements it is possible to induce in the mortar bed a structure of joint faces that has exactly two joint face assemblies.

In yet another preferred embodiment, provision is made that the carrier plate is quadrangular, in particular rectangular or square, and that it has marginal elements by means of which several of such plates can be connected with each other for covering a larger floor area, whereby two circumferential sides of each carrier plate are fitted with the one connecting element and the other two circumferential sides are equipped with the other complementing connecting element. The individual carrier plates can then be produced in handy sizes and be plugged together for covering larger floor areas. Such a connection is particularly useful also to prevent the carrier plates from slipping out of place when a paste-like floor finish is applied.

If the floor covering to be installed on the finished composition flooring is a rigid floor covering, for example such as tiles or natural stone, it is deemed recommendable if such floor covering is joined with the top side of the finish of the first composite floor structure by means of an additional composite floor structure as defined by the invention. The carrier plate then acts as a decoupling layer in order to compensate changes in length in the floor composition layer disposed underneath as stress is being built up or reduced, and to thus prevent such changes from being transmitted into the rigid floor covering. The carrier plate has distinctly smaller dimensions as the one intended for producing the composition flooring.

BRIEF DESCRIPTION OF THE DRAWINGS

Additional advantages and developments of the invention are the components of dependent claims as well as of the following description of exemplified embodiments explained by reference to the attached figures, in which:

DETAILED DESCRIPTION OF PREFERRED EMBODIMENTS

Figure 1:
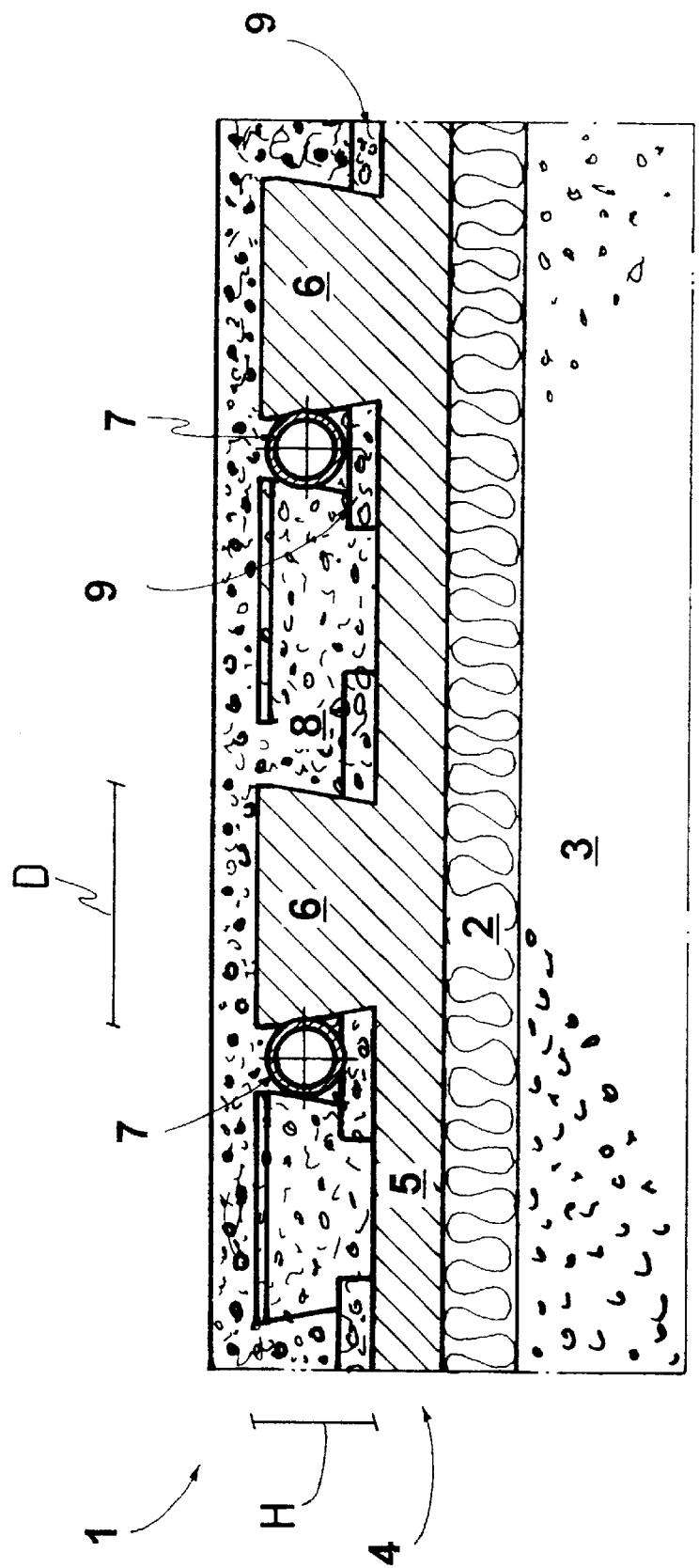
FIG. 1 shows a cross section through a cutout of a composite floor structure arranged on a substrate and serving as the subfloor.

FIG. 1 shows a composite floor structure 1, which is arranged on a concrete foundation 3 via an insulating board 2 for damping walking sound.

Composite floor structure 1 has a carrier plate 4 substantially comprising a base plate 5 and a great number of upwardly projecting structural elements 6. The arrangement comprising carrier plate 4 and plastic tubes 7, which are held clamped in said carrier plate, has been cast in flooring mortar 8 up to a predetermined covering height. Mortar 8 has a conventional composition of water and sand with additional aggregates, the components being mixed with cement as the vehicle.

Figure 2:
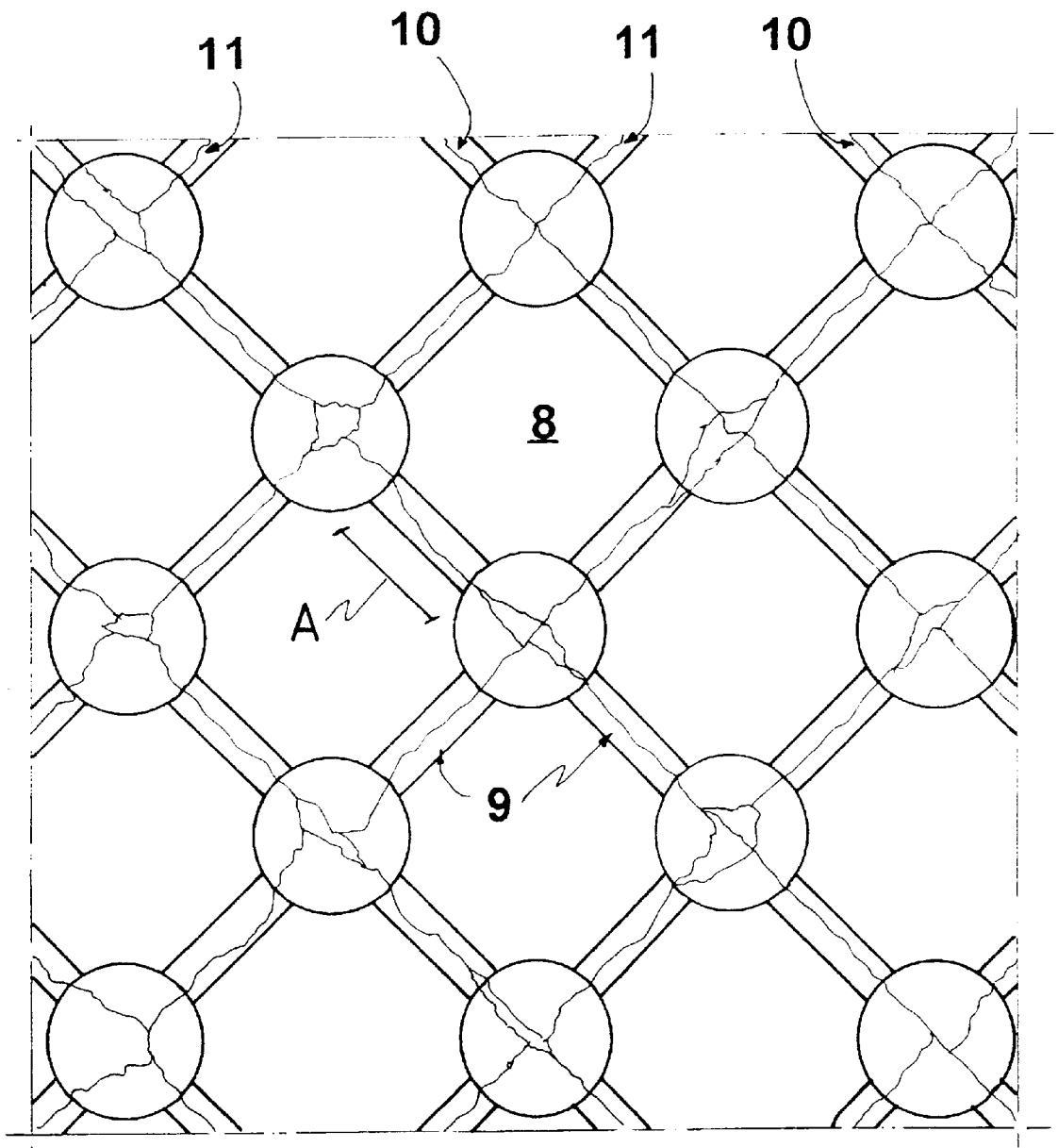
FIG. 2 is a bottom view of the mortar bed of the composite floor structure of FIG. 1.

In the above exemplified embodiment, height "H" of structural elements 6 amounts to 30 mm. Diameter "D" of structural elements 6 amounts to 60 mm, which results in a ratio of H:D of 1:2. The shortest spacing "A" between two structural elements 6 as shown in FIG. 2 comes to 45 mm, which results in a ratio of H:A of 1:1.5. Covering "Ü" of mortar layer 8 above a structural element 6 amounts to 10 mm, resulting in a ratio of H:Ü of 1:0.33. The total thickness accordingly amounts to H+Ü, which in the exemplified embodiment shown corresponds with 40 mm.

For the purpose of enhancing the engagement between flooring mortar 8 and structural elements 6, the latter are designed slightly undercut when carrier plate 4 is viewed from the top. Structural elements 4 shown here taper in the form of a cone toward base plate 5.

When stress builds up in mortar 8, for example due to the development of a temperature gradient, for example when the floor heating system is put into operation, mortar 8 is capable of absorbing such stress without fracturing up to a certain low degree of deformation. However, if such defined limit of stress absorption is exceeded, the negative structures formed by structural elements 6 in mortar 8 as weak areas act as zones for fracture zones for the reduction of stress. Due to the regular arrangement of structural elements 6 on base plate 5, joint face assemblies are then formed for reducing the stress, such joint face assemblies preferably developing along the shortest spacing "A" between two structural elements 6. The individual weak points formed by structural elements 6 are then connected with each other by the joint faces. The stress is thus reduced in a perforation-like pattern along a great number of joint faces arranged in parallel. Each individual joint face consequently compensates only a fraction of the overall stress, so that each joint face represents itself only as a hairline fissure.

The development of such joint faces connecting the weak areas formed by structural elements 6 is promoted by making provision for bridges 9 connecting structural elements 6 with one another, such bridges being arranged along the line where joint faces are intended to develop on base plate 5.

Two of such joint face assemblies 10, 11 are shown in FIG. 2, where mortar 8 is shown in a bottom view without carrier plate 4. It is clearly visible that the two joint face assemblies 10, 11 develop along the shortest spacings "A" between two weak areas formed by structural elements 6 within the zone of the tracks predetermined by bridges 9.

The excellent properties of composite floor structure 1 have been verified in a series of tests as well.

In the tests, the composite floor structure as defined by the invention was found to be stressable, for example with a multiple of the load bearing capacity of 1.5 kN/m² specified by applicable regulations for normal traffic loads in apartment construction in spite of an overall lower thickness of the flooring mortar. As opposed to known composite floor structures, the composite floor structure as defined by the invention, however, showed substantially superior results with respect to its bulging property. In particular., cracking that would destroy the floor covering is prevented.

In other embodiments, provision is made that the structural elements have a crack formation-favoring polygonal or star-shaped cross sectional shape. Such structural elements are preferably arranged in such a way that the shortest spacing between two structural elements extends between two edges of the structural elements. This edges have a favorable effect with respect to direction-induced cracking.

Figure 3:
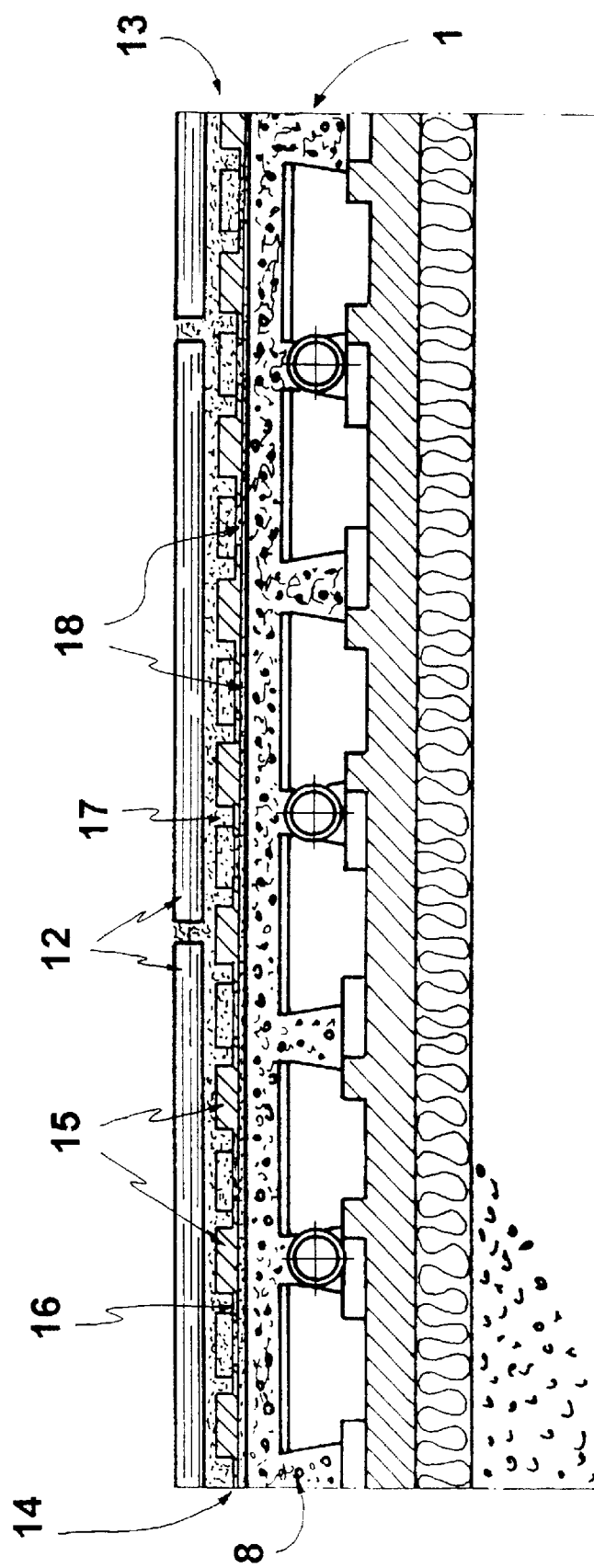
FIG. 3 shows the composite floor structure of FIG. 1 with a rigid floor covering applied thereto by means of an additional composite floor structure.

FIG. 3 shows a composite floor structure 1 covered by tiles 12. Tile covering 12 is glued to the surface of mortar 8 by means of a composite floor structure 13 of the same type. Carrier plate 14 employed for this purpose is designed in the same way as carrier plate 4 with respect to its structural elements 15, whereby, however, the absolute dimensioning is distinctly lower. Carrier plate 14 is a deep-drawn plastic foil. The height of a structural element 15 as shown in the exemplified embodiment according to FIG. 3 amounts to only about 4 mm measured above base plate 16. Carrier plate 14 is joined by gluing its underside to the top side of mortar 8 with mortar 17, whereby carrier plate 14 has break-throughs 18 for the passage of mortar 17. Carrier plate 14 serves as a decoupling layer, so that possible deformations s of composite floor structure 1, in particular of its mortar 8 are not transmitted into tile covering 12. The layer of tile covering adheres with its full surface to the layer consisting of adhesive mortar and in this way is forming the force-dominating component, so that changes in length and cracks are not transmitted to the covering layer. As explained above, movements of mortar 8 for reducing stress take place only in the order of magnitude of hairline fissures, so that such movements can be readily absorbed by carrier plate 14. In the presence of greater movements, mortar layer 17 fractures because of the development of joint face assemblies corresponding with the mortar layer 8 described above; however, the rigid layer of covering remains undamaged.

In another embodiment not shown, provision is made that a carrier plate corresponding with carrier plate 14 has apertures in the cylindrical segments of its structural elements. Apertures are provided in this way in addition to or instead of break-throughs 18, so that a honeycomb-like structure is obtained, through which the mortar can penetrate the zone located beneath the carrier plate.

Figure 4:
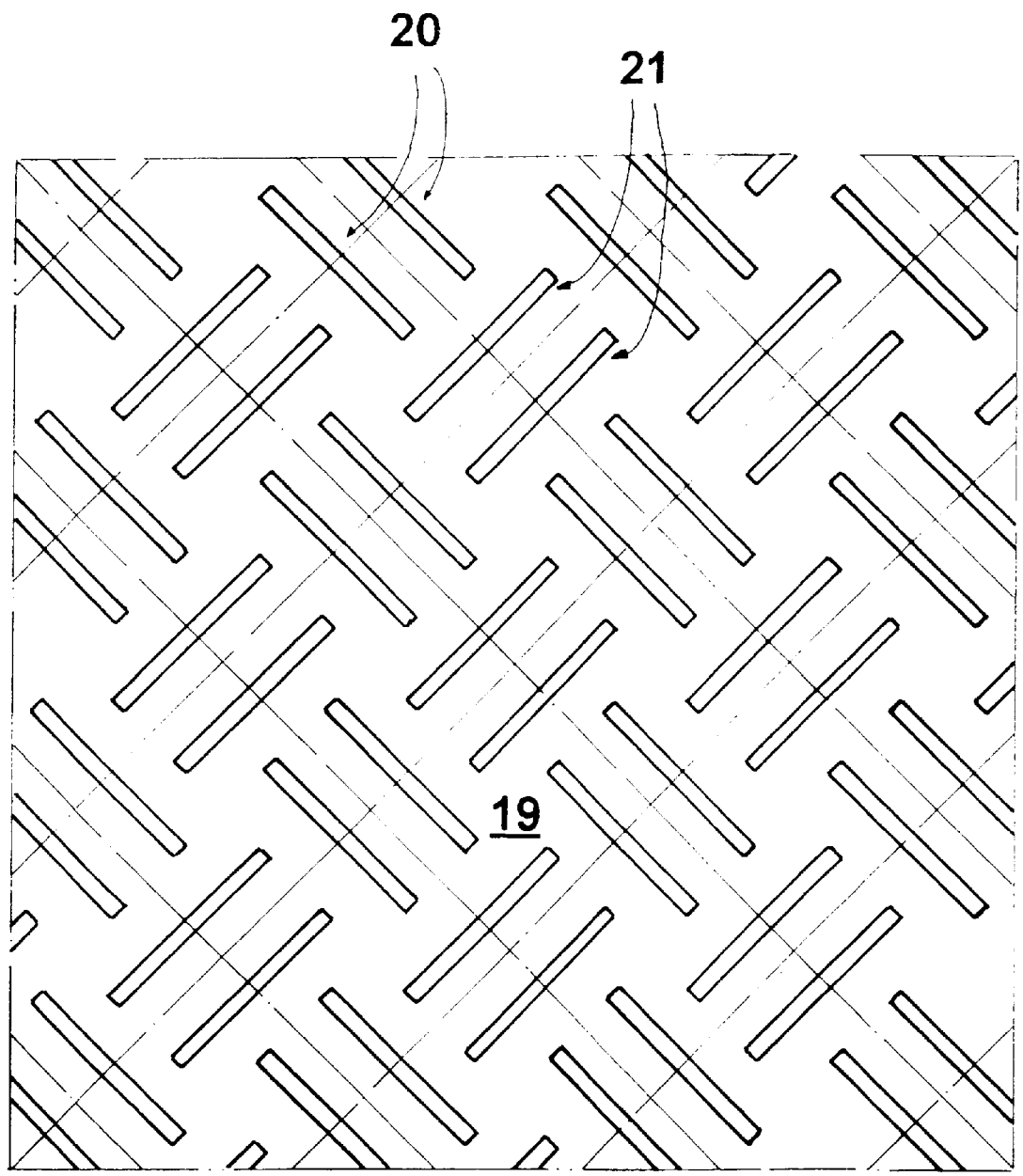
FIG. 4 is a bottom view of a mortar bed of a composite floor structure according to another exemplified embodiment.

FIG. 4 shows a bottom view of a flooring mortar 18 in another exemplified embodiment. As opposed to the exemplified embodiment shown in FIGS. 1 to 3, the potential fracture zones introduced as weak areas 20, 21 by suitable structural elements not shown in FIG. 4 are not point-like but arranged in a line. Two joint face assemblies can be formed with such a design, with their longitudinal expanse conforming to the longitudinal expanse of weak areas 20, 21. The design of such a mortar flooring 19 is useful if a metal sheet is used for producing a composite floor structure instead of carrier plate 4 made from insulating material. Punched and upwardly bent structural elements are associated with the metal sheet for producing structures 20, 21. Break-through are produced in this way between the structural elements, through which mortar 19 can pass for gluing it to the subfloor.

Figure 5:
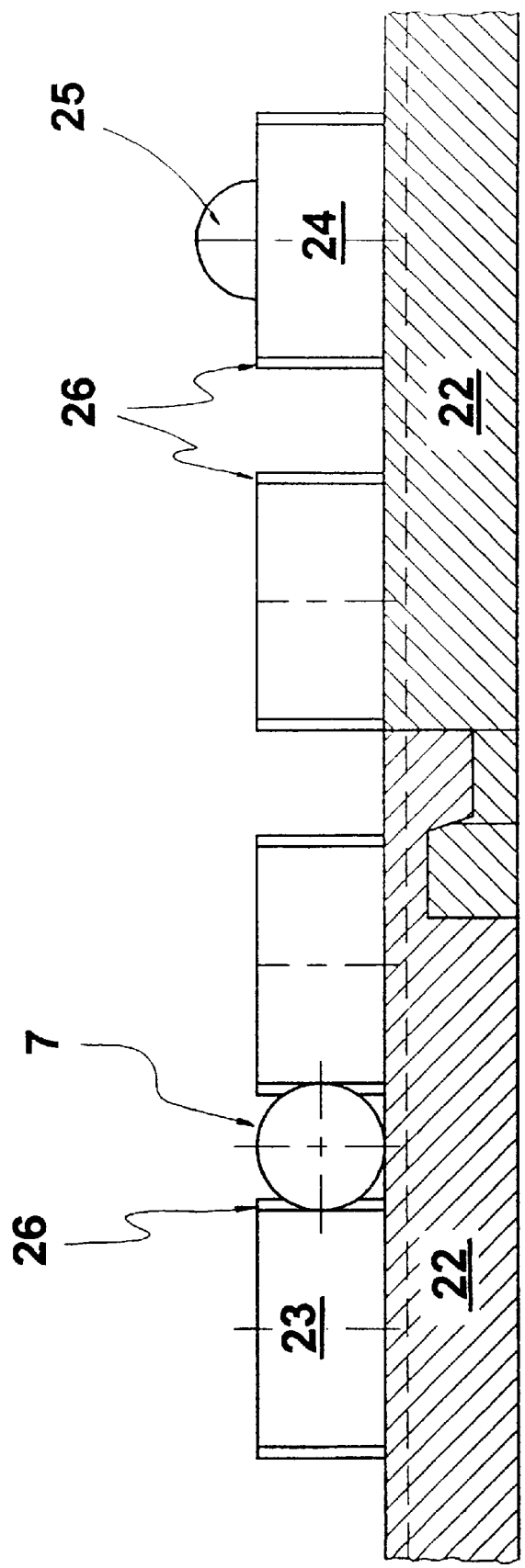
FIG. 5 shows a cross section through two carrier plates joined with each other, with the structural elements of the carrier plates having dome-like archings for dimensioning the thickness required for the flooring mortar.

In the exemplified embodiment shown in FIG. 5, two different structural elements 23, 24 are associated with carrier plates 22 shown here only by cutouts. Structural elements 23, 24 have a semispherical bulging 25 on their top sides. The height of arching 25 is dimensioned in such a way that such arching corresponds with the thickness intended for the mortar, so that such thickness can be used as an instruction for the dimensioning of the thickness of the mortar. A leveling beam resting on one or several of such archings 25 can then be pulled across the poured mortar in order to removed any excess amount of the latter. It is assured in this way, on the one hand, that the mortar covering on top of carrier plates 22 has an even thickness and that, on the other hand, an optimal mortar covering is obtained on top of structural elements 23, 24.

Furthermore, structural elements 23, 24 have clamping lips 26 arranged across the circumference, such clamping lips fixing plastic tubes 7 for a floor heating system in their desired positions between structural elements 23, 24.

In yet another embodiment not shown, provision is made that drainage ducts are installed in the carrier plates on the bottom sides. The drainage ducts usefully are duct assemblies intersecting each other. Such drainage ducts are connected with the top sides of the carrier plates by break-throughs, which are dimensioned in such a way that clogging of the ducts by plaster or mortar is prevented. It is then possible with the help of such a carrier plate to produce a composite floor structure as defined by the invention which is arranged with its bottom side on a sealing layer, for example a layer of bitumen, and which is thus drained. When the carrier plate is placed on the sealing layer the drainage ducts remain unfilled and thus serve as channels for draining off seepage water.

List of Reference Numerals

1 Composite floor structure
2 Insulating board
3 Concrete foundation
4 Carrier plate
5 Base plate
6 Structural element
7 Plastic tube
8 Mortar
9 Bridge
10 Joint face assembly
11 Joint face assembly
12 Tiles
13 Composite floor structure
14 Carrier plate
15 Structural element
16 Base plate
17 Mortar
18 Break-through
19 Mortar
20 Weak area
21 Weak area
22 Carrier plate
23 Structural element
24 Structural element
25 Arching
26 Clamping lip
H Height of a structural element -continued

| List of Reference Numerals |
| --- |
| D Diameter of a structural element |
| Ü Mortar covering within the zone of a structural element |

What is claimed is:

1. A composite floor covering structure with a mortar layer (8, 17, 19) set by a mineral agent and a carrier plate (4, 14, 22) adjoining the lower surface of the mortar layer (8, 17, 19), said carrier plate substantially consisting of a flat base element (5, 16) and upwardly projecting structural elements (6, 15, 23, 24) projecting into the mortar (8, 17, 19) and substantially having the same height, whereby the mortar covering (Ü) above the projecting structural elements (6, 15, 23, 24) is dimensioned in such a way that the negative structures formed by the structural elements (6, 15, 23, 24) in the mortar (8, 17, 19) represent predefined fracture zones (20, 21) for reducing occurring stresses, characterized in that the structural elements (6, 15, 23, 24) are spaced from each other and arranged according to a regular pattern with respect to the base element (5, 16) and molded on said element, said structural elements (6, 15, 23, 24) forming in the mortar layer (8, 17, 19) negative structures acting like a perforation, so that when stresses develop in the mortar layer (8, 17, 19), the negative structures are starting points for joint face assemblies (10, 11, 20, 21) spreading between said negative structures.

2. The composite structure according to claim 1, characterized by the following ratios for the arrangement of the structural elements (6, 15, 23, 24):

Height (H) of the structural elements (6, 15, 23, 24) to mortar covering (Ü) above the top edge of the structural elements (6, 15, 23, 24): lower than 1:1, particularly lower than 1:1.5, whereby the maximum mortar covering amounts to 20 mm Height (H) of the structural elements (6, 15, 23, 24) to the smallest spacing (A) of the structural elements (6, 15, 23, 24) from each other: lower than 1:5, preferably lower than 1:10, whereby said spacing amounts to 200 mm at the most.

3. The composite structure according to claim 1, characterized in that the upper terminal surface of the structural elements (24) is arched.

4. The composite structure according to claim 1, characterized in that the structural elements are oblong elements with a long-stretched rectangular cross section.

5. The composite structure according to claim 4, wherein the structural elements are arranged in adjacent pairs of first and second structural elements 90° to each other, said first structural element having an imaginary extension along its longitudinal expanse intersecting the center of the second structural element.

6. The composite structure according to claim 1, characterized in that the base element (5, 16) of the carrier plate (4, 14) has break-throughs (18).

7. The composite structure according to claim 1, characterized in that the carrier plate (4) consists of an insulating material.

8. The composite structure according to claim 1, characterized in that the carrier plate is made from a metal sheet, whereby the structural elements are outwardly bent segments of the metal sheet.

9. The composite structure according to claim 1, wherein the carrier plate is a plastic foil formed by a punching die in a deep-drawing process.

10. The composite structure according to claim 9, characterized in that the structural elements (15) of the punched plastic foil (14) have apertures for the passage of mortar.

11. The composite structure according to claim 1, characterized in that the carrier plate (4, 14) is quadrangular, in particular square, and has marginal elements by means of which a plurality of such plates are connectable with each other for covering a larger floor area, whereby two circumferential sides of each carrier plate (4, 14, 23, 24) are fitted with the one connecting element and the two other circumferential sides are equipped with the other connecting element designed as a complementary component.

12. The composite structure according to claim 1, characterized in that an additional composite floor structure (13) is bonded to the top side of the mortar layer (8) for applying thereto a rigid floor covering (12), whereby provision for the rigid floor covering (12) is made on the top side of the mortar layer (17) arranged on the carrier plate (14).

13. The composite structure according to claim 1, characterized in that a defined number of structural elements (24) have an upwardly projecting element (25) on their top sides, the height of said element corresponding with the thickness of the provided-for flooring plaster covering.

14. The composite structure according to claim 13, characterized in that the element has a semispherical arching (25).

15. The composite structure according to claim 1, characterized in that the structural elements (6, 15) of the carrier plate (4, 14) have a circular cross section in sectional planes arranged parallel with the areal expanse of the base element (5, 16).

16. The composite structure according to claim claim 1, characterized in that the structural elements of the carrier plate (22) have a polygonal or star-shaped cross section in sectional planes arranged parallel with the areal expanse of the base element (5, 16).

* * * * *